United States Patent [19]
Jenkins

[11] Patent Number: 5,581,937
[45] Date of Patent: Dec. 10, 1996

[54] PLANT WATERING APPARATUS

[76] Inventor: Darrell O. Jenkins, Rte. 1, Box 149, Homer, La. 71040

[21] Appl. No.: 523,494

[22] Filed: Sep. 1, 1995

[51] Int. Cl.$^6$ ..................................... A01G 9/04
[52] U.S. Cl. ..................................... 47/71; 47/81
[58] Field of Search ................ 47/71, 81 S, 66 D, 47/79 D

[56] References Cited

U.S. PATENT DOCUMENTS

| | | |
|---|---|---|
| D. 259,777 | 7/1981 | Ehrreich . |
| 3,769,748 | 11/1973 | Goldring ..................... 47/71 |
| 4,324,070 | 4/1982 | Swisher . |
| 4,339,891 | 7/1982 | Bassett ........................ 47/71 |
| 4,916,858 | 4/1990 | Hobson . |
| 4,962,613 | 10/1990 | Nalbandian ................. 47/71 |
| 5,129,183 | 7/1992 | Haw . |
| 5,212,905 | 5/1993 | Philoctete . |
| 5,272,835 | 12/1993 | Stern . |
| 5,309,670 | 5/1994 | Bates .......................... 47/71 |
| 5,341,596 | 8/1994 | Kao ............................. 47/71 |

FOREIGN PATENT DOCUMENTS

| | | | |
|---|---|---|---|
| 2149072 | 4/1973 | Germany ...................... 47/81 |
| 465067 | 8/1951 | Italy ............................ 47/71 |
| 654013 | 5/1951 | United Kingdom ......... 47/81 S |
| 754597 | 8/1954 | United Kingdom ............. 47/71 |

*Primary Examiner*—Terry Lee Melius
*Assistant Examiner*—Joanne C. Downs

[57] ABSTRACT

A plant watering apparatus includes a base portion and an outer wall portion projecting upward from the base portion. The base portion and the outer wall portion define a water storage chamber. A cover portion projects inward from the outer wall portion. A well portion projects downward from the cover portion into a portion of the water storage chamber. The well portion includes an aperture-containing portion which permits a quantity of water in the water storage chamber to flow into the well portion. The well portion includes a well wall portion projecting downward from the cover portion and a well floor portion connected to the well wall portion for receiving a plant container. The well floor portion includes a plurality of apertures. The outer wall portion has an outer wall height above the base portion. The well floor portion is supported by the well wall portion at a floor height above the base portion such that the outer wall height is greater than the floor height. A spout portion may project upward from the cover portion.

1 Claim, 3 Drawing Sheets

PLANT WATERING APPARATUS

BACKGROUND OF THE INVENTION

1. Field of the Invention

The present invention relates generally to plant watering devices and, more particularly, to devices that provide plants with a supply of water when left unattended.

2. Description of the Prior Art

Many persons keep plants in soil retained in pots that are kept indoors. Consequently, without access to natural rainfall, the plants must be watered periodically. For some persons, watering plants becomes a chore that is either forgotten or that is delayed or postponed, and, as a result, the plants may suffer from neglect. To avoid problems resulting from under watering, throughout the years, a number of innovations have been developed relating to automatic or unattended plant watering, and the following U.S. patents are representative of some of those innovations: U.S. Pat. Nos. 4,324,070; 4,916,858; 5,129,183; 5,212,905; 5,272,835; and U.S. Pat. No. Des. 259,777.

More specifically, each of U.S. Pat. Nos. 4,324,070 and 4,916,858 discloses a self-watering planter which provides a wick that extends from a water supply below to a plant pot above. Wicks have fibers and operate by capillary action of the fibers between the water supply and the plant pot for moving water upward, against the force of gravity. The fibers of wicks are subject to deterioration over time, and the capillary action may also deteriorate over time. To provide a more efficient watering device for a plant, it would be desirable if water from a water supply did not have to flow in a direction opposite to the force of gravity to reach a plant pot. Moreover, it would be desirable if a plant watering device provided water to a plant pot without using a wick between a water supply and a plant pot.

U.S. Pat. No. 5,129,183 discloses a self-watering flowerpot which includes a first valve member which projects downward from a flowerpot and a second valve member which projects upward from a water supply below. By rotating the first valve member with respect to the second valve member, a flow rate of water from the water supply below to the flowerpot above can be regulated. In general, valves can stick and valves can clog. To avoid the potential problems associated with the use of a valve to control water flow from a water supply to a flowerpot, it would be desirable if a plant watering device does not employ valve structures.

U.S. Pat. No. 5,212,905 discloses a plant watering device that provides a shroud for covering a plant. The shroud takes up quite a bit of space and shields the plant from sunlight. In this respect, it would be desirable if a plant watering device does not employ a shroud that covers a plant in a plant pot.

U.S. Pat. No. 5,272,835 discloses a self-watering pot that includes a watering ring that fits onto the upper rim of a plant pot. The watering ring is connected to a pressurized water supply, and a valve is used between the pressurized water supply and the watering ring. The problem of a valve has been discussed hereinabove. Moreover, the watering ring must be fashioned to fit a particular plant pot rim radius. If the radius of the plant pot rim is either smaller or larger than the radius of the watering ring, then the watering ring will not fit properly on the upper rim of the plant pot. In this respect, it would be desirable if a plant watering device does not employ a watering ring that fits onto the upper rim of a plant pot.

U.S. Pat. No. Des. 259,777 may be of interest for its disclosure of self-watering plant trays.

Still other features would be desirable in a plant watering apparatus. For example, a natural water pressure is developed by a hydrostatic head. A hydrostatic head is present when a water level in a water supply is greater than a water level in a object which receives water from the water supply. To utilize such a natural water pressure, it would be desirable if a plant watering device utilizes a hydrostatic head for providing water to a plant pot.

Although it may not be practical or possible to provide a plant watering apparatus that can be used for all sizes of plant pots, it would be desirable if a plant watering device could be used with a defined range of sizes of plant pots. For example, it would be desirable if a plant watering device were provided that can be used with a range of sizes of plant pots, ranging from a maximum defined size to substantially all plant pots having sizes smaller than the maximum defined size.

Thus, while the foregoing body of prior art indicates it to be well known to use plant watering devices, the prior art described above does not teach or suggest a plant watering apparatus which has the following combination of desirable features: (1) does not require water from a water supply to flow in a direction opposite to the force of gravity to reach a plant pot; (2) does not employ a wick between a water supply and a plant pot; (3) does not employ valve structures; (4) does not employ a shroud that covers a plant in a plant pot; (5) does not employ a watering ring that fits onto the upper rim of a plant pot; (6) utilizes a hydrostatic head for providing water to a plant pot; and (7) can be used with a range of sizes of plant pots, ranging from a maximum defined size to substantially all plant pots being smaller than the maximum defined size. The foregoing desired characteristics are provided by the unique plant watering apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a plant watering apparatus which includes a base portion and an outer wall portion projecting upward from the base portion. The base portion and the outer wall portion define a water storage chamber. A cover portion projects inward from the outer wall portion. A well portion projects downward from the cover portion into a portion of the water storage chamber. The well portion includes an aperture-containing portion which permits a quantity of water in the water storage chamber to flow into the well portion. The well portion includes a well wall portion projecting downward from the cover portion and a well floor portion connected to the well wall portion for receiving a plant container. The well floor portion includes a plurality of apertures. The outer wall portion has an outer wall height above the base portion. The well floor portion is supported by the well wall portion at a floor height above the base portion such that the outer wall height is greater than the floor height. A spout portion may project upward from the cover portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant watering apparatus which has all of the advantages of the prior art and none of the disadvantages.

It is another object of the present invention to provide a new and improved plant watering apparatus which may be easily and efficiently manufactured and marketed.

It is a further object of the present invention to provide a new and improved plant watering apparatus which is of durable and reliable construction.

An even further object of the present invention is to provide a new and improved plant watering apparatus which is susceptible of a low cost of manufacture with regard to both materials and labor, and which accordingly is then susceptible of low prices of sale to the consuming public, thereby making such plant watering apparatus available to the buying public.

Still yet a further object of the present invention is to provide a new and improved plant watering apparatus which does not require water from a water supply to flow in a direction opposite to the force of gravity to reach a plant pot.

Still another object of the present invention is to provide a new and improved plant watering apparatus that does not employ a wick between a water supply and a plant pot.

Yet another object of the present invention is to provide a new and improved plant watering apparatus which does not employ valve structures.

Even another object of the present invention is to provide a new and improved plant watering apparatus that does not employ a shroud that covers a plant in a plant pot.

Still a further object of the present invention is to provide a new and improved plant watering apparatus which does not employ a watering ring that fits onto the upper rim of a plant pot.

Yet another object of the present invention is to provide a new and improved plant watering apparatus that utilizes a hydrostatic head for providing water to a plant pot.

Still another object of the present invention is to provide a new and improved plant watering apparatus which can be used with a range of sizes of plant pots, ranging from a maximum defined size to substantially all plant pots being smaller than the maximum defined size.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
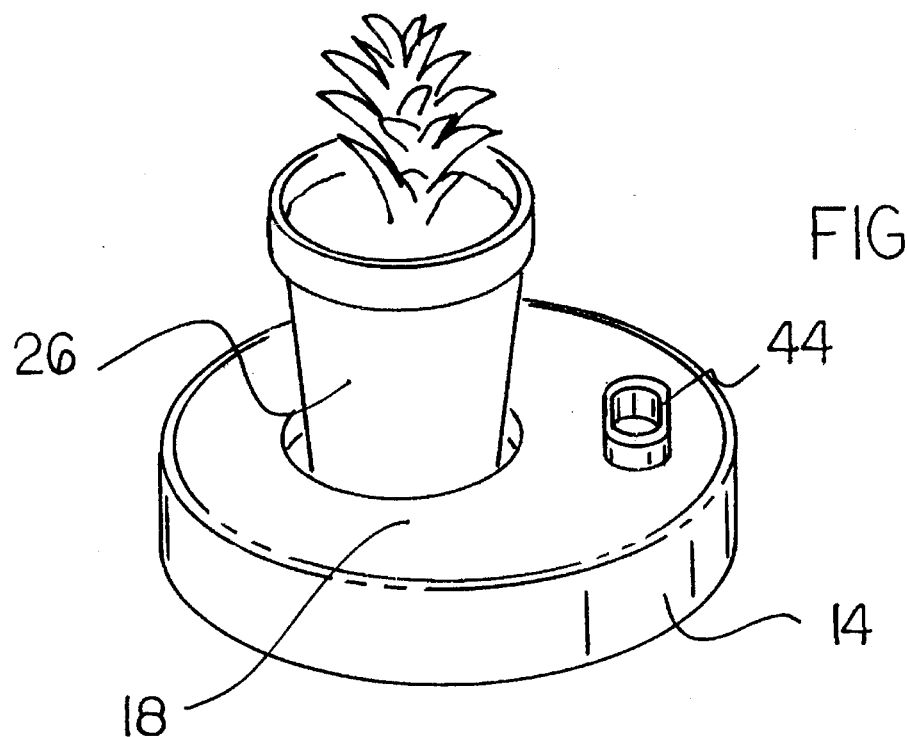
FIG. 1 is a perspective view showing a first embodiment of the plant watering apparatus of the invention with a plant in a plant pot placed thereon.
Figure 2:
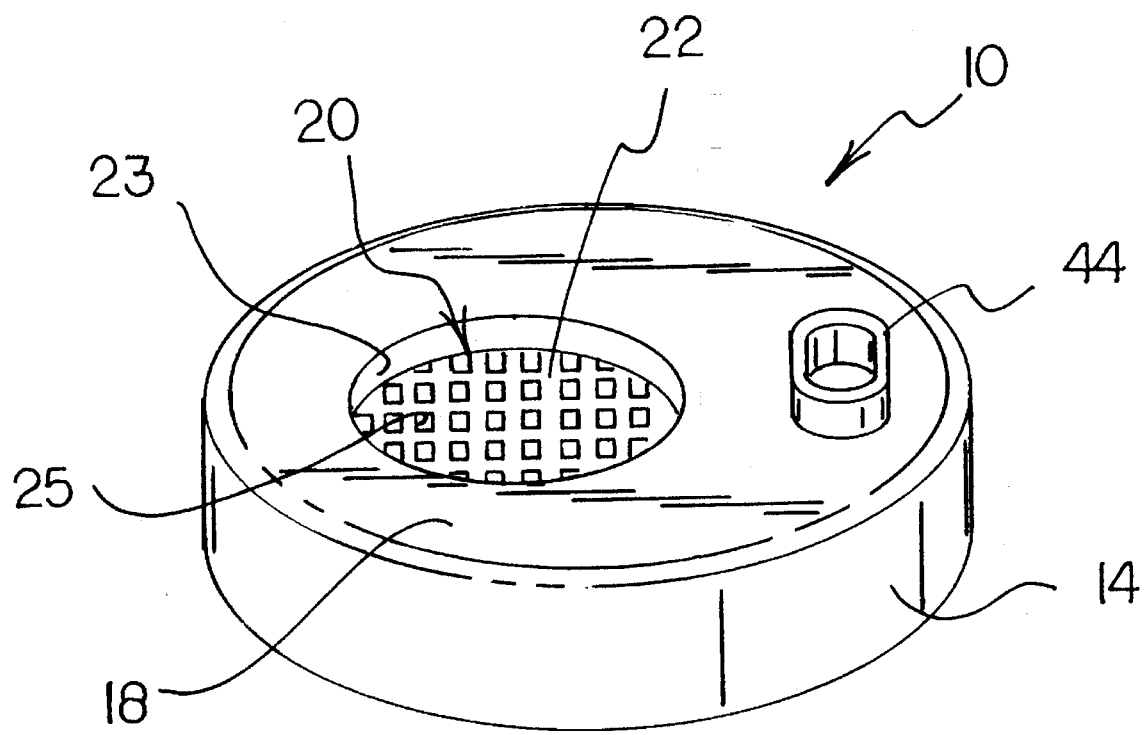
FIG. 2 is an enlarged perspective view of the embodiment of the plant watering apparatus shown in FIG. 1 with the plant pot removed.
Figure 3:
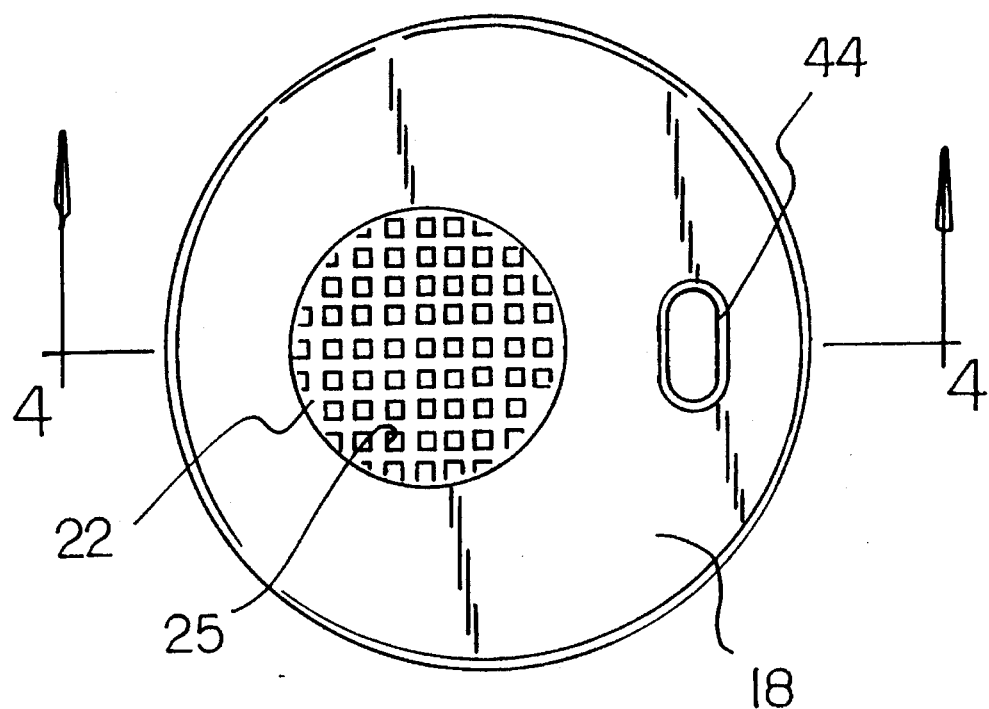
FIG. 3 is a top view of the embodiment of the plant watering apparatus of FIG. 2.
Figure 4:
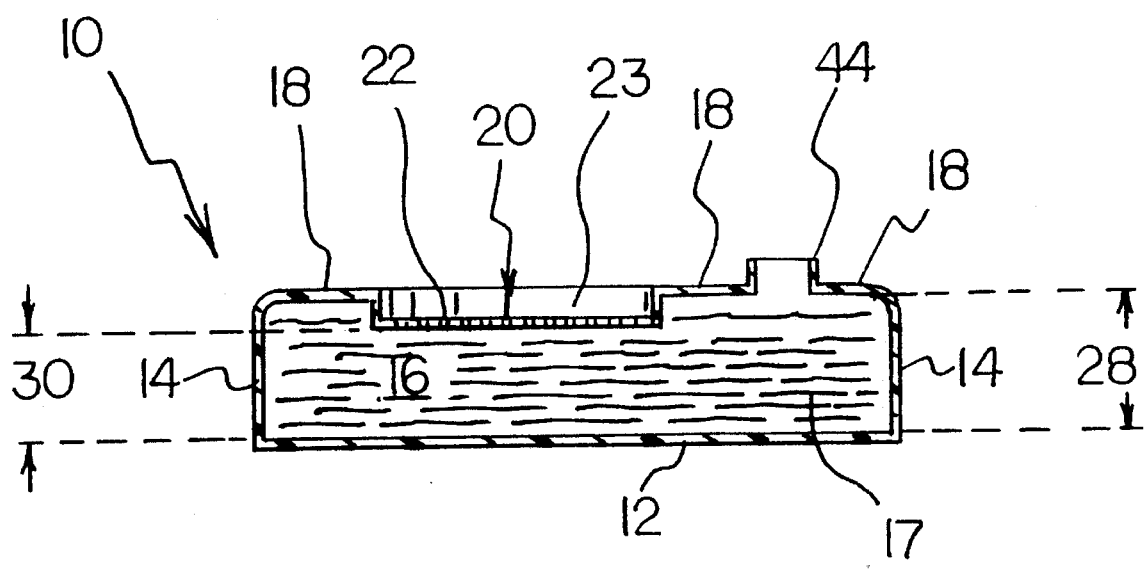
FIG. 4 is a cross-sectional view of the embodiment of the invention shown in FIG. 3 taken along line 4—4 thereof.

With reference to the drawings, a new and improved plant watering apparatus embodying the principles and concepts of the present invention will be described.

Turning to FIGS. 1–4, there is shown a first embodiment of the plant watering apparatus of the invention generally designated by reference numeral 10. In its preferred form, the plant watering apparatus 10 includes a base portion 12 and an outer wall portion 14 projecting upward from the base portion 12. The base portion 12 and the outer wall portion 14 define a water storage chamber 16. A cover portion 18 projects inward from the outer wall portion 14. A well portion 20 projects downward from the cover portion 18 into a portion of the water storage chamber 16. The well portion 20 includes an aperture-containing portion which permits a quantity of water in the water storage chamber 16 to flow into the well portion 20. The well portion 20 includes a well wall portion 23 projecting downward from the cover portion 18 and a well floor portion 22 connected to the well wall portion 23 for receiving a plant container 26. The well floor portion 22 includes a plurality of apertures 25.

The outer wall portion 14 has an outer wall height 28 above the base portion 12. The well floor portion 22 is supported by the well wall portion 23 at a floor height 30 above the base portion 12 such that the outer wall height 28 is greater than the floor height 30. The difference between the outer wall height 28 and the floor height 30 accounts for the hydrostatic head exerted by the water in the well portion 20 on the bottom of the plant container 26 when the water storage chamber 16 is full of water. Spout portion 44 projects upward from the cover portion 18. The spout portion 44 permits addition of water to the water storage chamber 16.

In using the first embodiment of the plant watering apparatus 10 of the invention, a plant container 26 is placed on the well floor portion 22. A quantity of water 17 is added to the water storage chamber 16. The water 17 can be added to the well portion 20 if no spout portion 44 is present. If a spout portion 44 is present, the water 17 can be added through the spout portion 44 or can be added directly to the well portion 20. A sufficient mount of water 17 is added so that the water level within the water storage chamber 16 rises to the outer wall height 28 of the outer wall portion 14. Some water passes upward from the water storage chamber 16 through the apertures 25 in the well floor portion 22 into the well portion 20 to seek a water level equal to the outer wall height 28. In this way, a hydrostatic head is applied to the bottom of the plant container 26 equal to the difference between the outer wall height 28 and the floor height 30.

Figure 5:
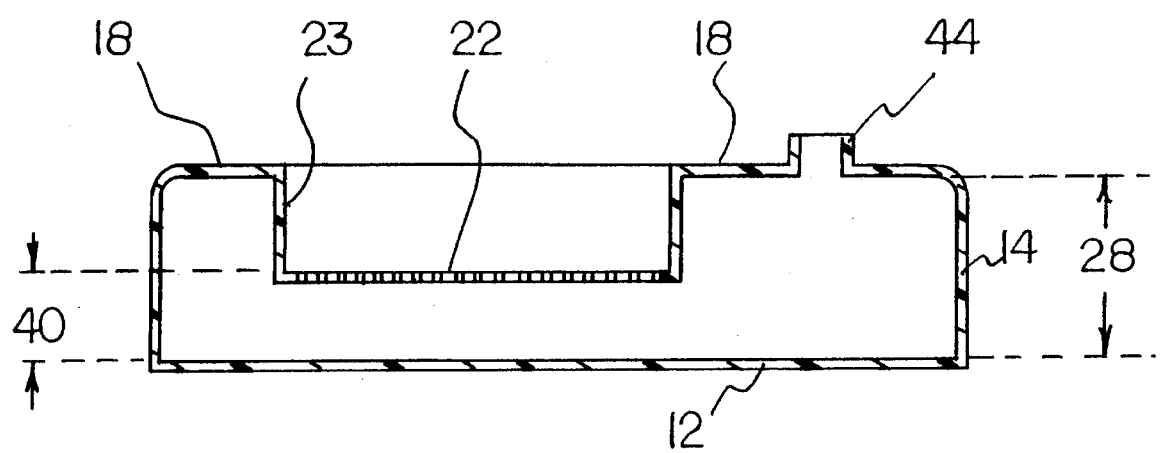
FIG. 5 is a cross-sectional view of a second embodiment of the invention.

Turning to FIG. 5, a second embodiment of the invention is shown. Reference numerals are shown that correspond to like reference numerals that designate like elements shown in the other figures. In the second embodiment, a floor height 40 is present which is smaller than the floor height 30 for the first embodiment of the invention. The outer wall height 28 is the same as the first embodiment of the invention. In view of the fact that the hydrostatic head is determined by the difference between the floor height 40 and the outer wall height 28, the hydrostatic head for the second embodiment is greater than the hydrostatic head of the first embodiment.

Figure 6:
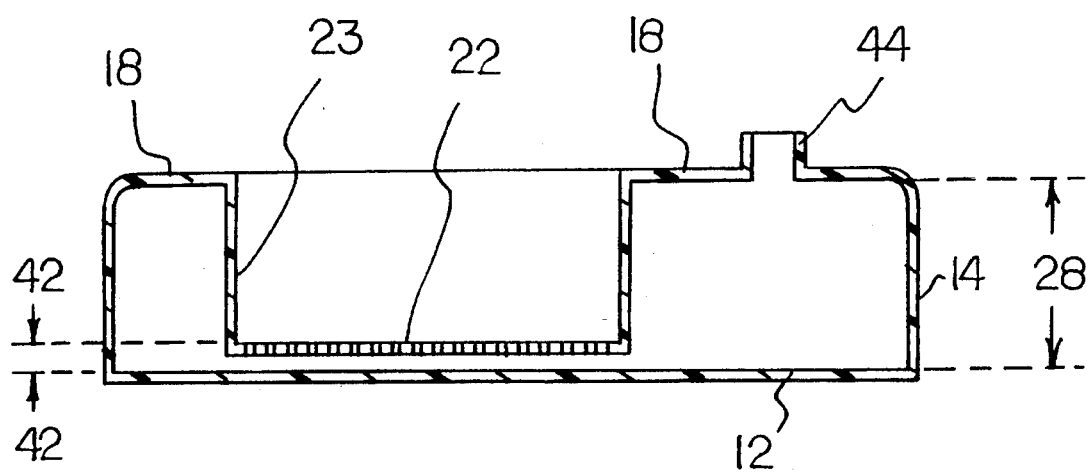
FIG. 6 is a cross-sectional view of a third embodiment of the invention.

Turning to FIG. 6, a third embodiment of the invention is shown. Reference numerals are shown that correspond to like reference numerals that designate like elements shown in the other figures. In the third embodiment, a floor height 42 is present which is smaller than the floor height 40 for the second embodiment of the invention. The outer wall height 28 is the same as the first and second embodiments of the invention. In view of the fact that the hydrostatic head is determined by the difference between the floor height 42 and the outer wall height 28, the hydrostatic head for the third embodiment is greater than the hydrostatic head of either the first or the second embodiments.

The components of the plant watering apparatus of the invention can be made from inexpensive and durable plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved plant watering apparatus that is low in cost, relatively simple in design and operation, and which may advantageously be used without requiring water from a water supply to flow in a direction opposite to the force of gravity to reach a plant pot. With the invention, a plant watering apparatus is provided which does not employ a wick between a water supply and a plant pot. With the invention, a plant watering apparatus is provided which does not employ valve structures. With the invention, a plant watering apparatus is provided which does not employ a shroud that covers a plant in a plant pot. With the invention, a plant watering apparatus is provided which does not employ a watering ring that fits onto the upper rim of a plant pot. With the invention, a plant watering apparatus is provided which utilizes a hydrostatic head for providing water to a plant pot. With the invention, a plant watering apparatus is provided which can be used with a range of sizes of plant pots, ranging from a maximum defined size to substantially all plant pots being smaller than the maximum defined size.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A plant watering apparatus, comprising:

a base portion, an outer wall portion projecting upward from said base portion, wherein said base portion and said outer wall portion define a water storage chamber, a cover portion which projects inward from said outer wall portion and defines a top surface, and a well portion which projects downward from said cover portion top surface into a portion of said water storage chamber, wherein said well portion includes an aperture-containing portion which permits a quantity of water in said water storage chamber to flow into said well portion, wherein said well portion includes a well wall portion projecting downward from said cover portion top surface and a well floor portion, connected to said well wall portion, for receiving a plant container, wherein said well floor portion includes a plurality of apertures, wherein said outer wall portion has an outer wall height above said base portion, and said well floor portion is supported by said well wall portion at a floor height above said base portion, such that said outer wall height is greater than said floor height, said plant watering apparatus further including:

a spout portion projecting upward from said cover portion above said top surface such that the presence of the level of water in said spout assures that the water in said water storage chamber is above said well floor portion.

* * * * *